United States Patent
Li

(10) Patent No.: US 9,930,705 B2
(45) Date of Patent: Mar. 27, 2018

(54) MOBILE TERMINAL CONTROL METHOD, APPARATUS AND SYSTEM

(71) Applicant: TENCENT TECHNOLOGY (SHENZHEN) COMPANY LIMITED, Shenzhen, Guangdong (CN)

(72) Inventor: Danhua Li, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/159,300

(22) Filed: May 19, 2016

(65) Prior Publication Data
US 2016/0262196 A1   Sep. 8, 2016

Related U.S. Application Data

(63) Continuation of application No. PCT/CN2015/076423, filed on Apr. 13, 2015.

(30) Foreign Application Priority Data

Apr. 14, 2014 (CN) .......................... 2014 1 0149233

(51) Int. Cl.
*H04W 76/02* (2009.01)
*G06F 9/44* (2006.01)
(Continued)

(52) U.S. Cl.
CPC .......... *H04W 76/02* (2013.01); *G06F 21/305* (2013.01); *H04L 61/2007* (2013.01);
(Continued)

(58) Field of Classification Search
CPC ....... H04L 63/08; H04L 67/025; H04L 67/08; H04L 63/0823; H04L 63/083;
(Continued)

(56) References Cited

U.S. PATENT DOCUMENTS

| 7,277,726 B2 | 10/2007 | Ahya et al. |
| 7,475,419 B1 * | 1/2009 | Basu ..................... H04L 63/105 709/229 |

(Continued)

FOREIGN PATENT DOCUMENTS

| CN | 102170617 A | 8/2011 |
| CN | 102984568 A | 3/2013 |
| WO | WO-2005109658 A1 | 11/2005 |

OTHER PUBLICATIONS

International Search Report & Written Opinion of the ISA for PCT/CN2015/076423, ISA/CN, Haidian District, Beijing, dated Oct. 13, 2015.

(Continued)

*Primary Examiner* — Daniel Lai
(74) *Attorney, Agent, or Firm* — Morgan, Lewis & Bockius LLP

(57) ABSTRACT

A mobile terminal control method includes: acquiring, by a mobile terminal, system permission of an operating system of the mobile terminal; establishing, by the mobile terminal, a connection to a remote control device; receiving, by the mobile terminal, a remote control instruction from the remote control device, the remote control instruction being an instruction recognizable to the operating system of the mobile terminal, and the remote control instruction being used for remote control over the mobile terminal; and recognizing, by the mobile terminal, the remote control instruction by using the operating system, and executing an operation corresponding to the remote control instruction on the basis of the system permission.

11 Claims, 2 Drawing Sheets

(51) Int. Cl.
*G06F 21/30* (2013.01)
*H04L 29/12* (2006.01)
*H04L 29/06* (2006.01)
*H04W 12/08* (2009.01)
*H04W 12/06* (2009.01)
*H04L 29/08* (2006.01)

(52) U.S. Cl.
CPC ............ *H04L 63/10* (2013.01); *H04W 12/08* (2013.01); *G06F 9/4445* (2013.01); *H04L 67/025* (2013.01); *H04L 67/08* (2013.01); *H04W 12/06* (2013.01)

(58) Field of Classification Search
CPC ..... H04L 61/2007; H04L 12/08; H04L 63/10; G06F 9/4445; G06F 3/0484; G06F 21/31; G06F 21/33; G06F 21/305; H04W 84/12; H04W 12/06; H04W 4/005; H04W 76/02; H04W 76/023; H04W 12/08
See application file for complete search history.

(56) References Cited

U.S. PATENT DOCUMENTS

| | | | |
|---|---|---|---|
| 9,172,740 B1* | 10/2015 | Jia | H04L 67/02 |
| 2003/0117497 A1 | 6/2003 | Nicolaisen et al. | |
| 2005/0259618 A1* | 11/2005 | Ahya | H04W 24/00 370/331 |
| 2006/0103508 A1* | 5/2006 | Sato | G06F 3/038 340/286.01 |
| 2011/0257958 A1 | 10/2011 | Kildevaeld | |
| 2011/0258327 A1* | 10/2011 | Phan | H04W 76/023 709/227 |
| 2012/0151372 A1* | 6/2012 | Kominac | G06F 17/30905 715/740 |
| 2012/0208571 A1* | 8/2012 | Park | H04L 67/1063 455/466 |
| 2013/0063377 A1 | 3/2013 | Seo | |
| 2013/0332556 A1* | 12/2013 | Chen | H04L 47/10 709/208 |
| 2014/0089487 A1 | 3/2014 | Debate | |
| 2014/0130137 A1* | 5/2014 | Baek | H04W 12/08 726/4 |
| 2015/0081764 A1* | 3/2015 | Zhao | H04L 67/08 709/203 |
| 2015/0113424 A1* | 4/2015 | Sun | G06F 9/4445 715/740 |

OTHER PUBLICATIONS

Extended European Search Report regarding Application No. 15779234.2-1870/3132621, dated May 3, 2017.

* cited by examiner

MOBILE TERMINAL CONTROL METHOD, APPARATUS AND SYSTEM

CROSS-REFERENCE TO RELATED APPLICATIONS

The present application is a continuation application of International Application No. PCT/CN2015/076423 filed on Apr. 13, 2015, which claims priority to Chinese Patent Application No. 201410149233.8 filed with the Chinese State Intellectual Property Office on Apr. 14, 2014, both of which are incorporated herein by reference in entirety.

FIELD OF THE TECHNOLOGY

The present disclosure relates to the field of mobile terminals, and in particular, to a mobile terminal control method, apparatus and system.

BACKGROUND OF THE DISCLOSURE

With the development of communications technologies, mobile terminals are widely used, for example, mobile phones and tablet computers can be seen everywhere. With mobile terminals, people can not only have conversations with each other but also access mobile networks to acquire data information. Existing mobile terminals can only be controlled by manually touching virtual keys on the mobile terminals or pressing physical keys on the mobile terminals, and the mobile terminals cannot be controlled remotely. For example, user A is equipped with mobile terminals such as a mobile phone and a tablet computer, but user A forgets to carry the mobile phone when going to work. Because most contacts are stored in the mobile phone, user A cannot contact families or clients in time if user A cannot control the mobile phone remotely, which affects life and work.

At present, there is no effective solution to the problem that mobile terminals cannot be controlled remotely in the existing technology.

SUMMARY

One embodiment of the present disclosure is to provide a mobile terminal control method, apparatus and system, so as to solve the problem that mobile terminals cannot be controlled remotely in the existing technology.

According to an aspect of the present disclosure, a mobile terminal control method is provided. The mobile terminal control method according to the present disclosure includes: acquiring, by a mobile terminal, system permission of an operating system of the mobile terminal; establishing, by the mobile terminal, a connection to a remote control device; receiving, by the mobile terminal, a remote control instruction from the remote control device, the remote control instruction being an instruction recognizable to the operating system of the mobile terminal, and the remote control instruction being used for remote control over the mobile terminal; and recognizing, by the mobile terminal, the remote control instruction by using the operating system, and executing an operation corresponding to the remote control instruction on the basis of the system permission.

According to another aspect of the present disclosure, a mobile terminal control method is provided. The mobile terminal control method according to the present disclosure includes: establishing, by a remote control device, a connection to a mobile terminal, the mobile terminal being a terminal that acquires system permission of an operating system of its own; and sending, by the remote control device, a remote control instruction to the mobile terminal, the remote control instruction being an instruction recognizable to the operating system of the mobile terminal, the remote control instruction being used for remote control over the mobile terminal, and the mobile terminal recognizing the remote control instruction by using the operating system, and executing an operation corresponding to the remote control instruction on the basis of the system permission.

According to another aspect of the present disclosure, a mobile terminal control apparatus is provided. The mobile terminal control apparatus according to the present disclosure includes: an acquiring unit, configured to enable a mobile terminal to acquire system permission of an operating system of the mobile terminal; an establishing unit, configured to enable the mobile terminal to establish a connection to a remote control device; a first receiving unit, configured to enable the mobile terminal to receive a remote control instruction from the remote control device, the remote control instruction being an instruction recognizable to the operating system of the mobile terminal, and the remote control instruction being used for remote control over the mobile terminal; and an execution unit, configured to enable the mobile terminal to recognize the remote control instruction by using the operating system, and execute an operation corresponding to the remote control instruction on the basis of the system permission.

According to another aspect of the present disclosure, a mobile terminal control apparatus is provided. The mobile terminal control apparatus according to the present disclosure includes: an establishing unit, configured to enable a remote control device to establish a connection to a mobile terminal, the mobile terminal being a terminal that acquires system permission of an operating system of its own; and a first sending unit, configured to enable the remote control device to send a remote control instruction to the mobile terminal, the remote control instruction being an instruction recognizable to the operating system of the mobile terminal, the remote control instruction being used for remote control over the mobile terminal, and the mobile terminal recognizing the remote control instruction by using the operating system, and executing an operation corresponding to the remote control instruction on the basis of the system permission.

According to another aspect of the present disclosure, a mobile terminal control system is provided. The mobile terminal control system according to the present disclosure includes: a mobile terminal, configured to acquire system permission of an operating system of the mobile terminal; a remote control device, configured to establish a connection to the mobile terminal and send a remote control instruction to the mobile terminal, the remote control instruction being an instruction recognizable to the operating system of the mobile terminal, and the remote control instruction being used for remote control over the mobile terminal, and the mobile terminal recognizing the remote control instruction by using the operating system, and executing an operation corresponding to the remote control instruction on the basis of the system permission.

In embodiments of the present invention, a mobile terminal acquires system permission of an operating system of the mobile terminal; the mobile terminal establishes a connection to a remote control device; the mobile terminal receives a remote control instruction from the remote control device, the remote control instruction being an instruction recognizable to the operating system of the mobile terminal, and the remote control instruction being used for remote control over the mobile terminal; and the mobile terminal recognizes the remote control instruction by using the operating system, and executes an operation corresponding to the remote control instruction on the basis of the system permission. The embodiments of the present invention solve the problem that mobile terminals cannot be controlled remotely in the existing technology, and achieve an effect of controlling mobile terminals remotely.

BRIEF DESCRIPTION OF THE DRAWINGS

The section provides a general summary of the disclosure, and is not a comprehensive disclosure of its full scope or all of its features.

In order to illustrate technical solutions according to embodiments of the disclosure, the drawings to be used in the description of the embodiment of the disclosure will be described briefly hereinafter. The drawings described hereinafter include only some embodiments related to the present disclosure. Other drawings may be determined by those skilled in the art based on these drawings without any creative effort.

DESCRIPTION OF EMBODIMENTS

Figure 1:
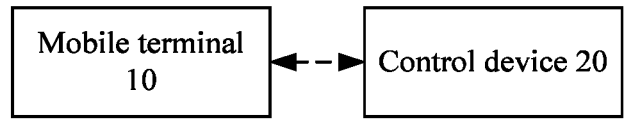
FIG. 1 is a schematic diagram of a mobile terminal control system according to an embodiment of the present invention.

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part of rather than all of the embodiments of the present invention. All other embodiments obtained by a person of ordinary skill in the art based on the embodiments of the present invention without creative efforts shall fall within the protection scope of the present disclosure.

It should be noted that, the terms such as "first" and "second" in the specification, the claims, and the foregoing accompanying drawings of the present disclosure are used to distinguish similar objects, and are not necessarily used to describe a specific sequence or specific precedence order. It should be understood that, data used in this manner may be interchanged under an appropriate circumstance, so that the embodiments of the present invention described herein can be implemented in other sequences than the sequence shown in the drawings or described herein. In addition, the terms "include" and "have", and any variants thereof are intended to cover a non-exclusive inclusion, for example, a process, method, system, product, or device that includes a series of steps or units is not necessarily limited to the steps or units specified expressly, but may include other steps or units not specified expressly or may include steps or units inherent to the process, method, product or device.

An embodiment of the present invention provides a mobile terminal control system.

FIG. 1 is a schematic diagram of a mobile terminal control system according to an embodiment of the present invention. As shown in FIG. 1, the mobile terminal control system includes a mobile terminal 10 and a remote control device 20.

The mobile terminal 10 is configured to acquire system permission of an operating system of the mobile terminal. The remote control device 20 is configured to establish a connection to the mobile terminal 10, and send a remote control instruction to the mobile terminal 10, the remote control instruction being an instruction recognizable to the operating system of the mobile terminal 10, and the remote control instruction being used for remote control over the mobile terminal 10. The mobile terminal 10 receives the remote control instruction, and the mobile terminal 10 recognizes the remote control instruction by using the operating system, and executes an operation corresponding to the remote control instruction on the basis of the system permission.

The mobile terminal may be a mobile device such as a mobile phone or a tablet computer; the system permission may be system permission of an operating system installed on the mobile terminal, and the system permission may be used for controlling some or all functions of the mobile terminal, for example, the system permission is a root privilege of the mobile phone, where root is user account of a super administrator in a Linux system and a unix system, and this account has supremacy over the whole operating system and can operate all objects.

In this embodiment of the present invention, the system permission of the mobile terminal may be acquired in a system granting manner or a root privilege granting manner. The system granting manner refers to that: when a mobile terminal such as a mobile phone leaves factory, a vendor grants corresponding system permission to an application on the mobile terminal, so that the application on the mobile terminal can implement a simulated system response event after acquiring the system permission. The root privilege refers to that, on a mobile terminal that uses Android system as an operating system, a root privilege of the system may be acquired by using an application or program code when there is no system grant, so as to implement absolute control over the mobile terminal; or some control events may be simulated when there is no root privilege or system permission. The system permission of the operating system of the mobile terminal is acquired so as to control the mobile terminal on the basis of the permission.

The remote control device may be a device, such as a mobile phone, a tablet computer, a personal computer (PC), or other terminal devices, for controlling the mobile terminal. The mobile terminal establishes a connection to the remote control device, to facilitate communication between the remote control device and the mobile terminal, so that the remote control device controls the mobile terminal. Specifically, the remote control device may send a connection request, and the mobile terminal receives the connection request from the remote control device, and authenticates the connection request. After the authentication succeeds, the mobile terminal may establish the connection to the remote control device in a form of an IP direct connection. After the connection is established, the IP direct connection may serve as a channel for control, and the remote control device sends a control instruction to the mobile terminal through the IP direct connection channel. Certainly, when establishing the connection to the remote control device, the mobile device may use a server to authenticate the connection request.

After the mobile terminal establishes the connection to the remote control device, the remote control device may send a remote control instruction to the mobile terminal, where the remote control instruction is an instruction recognizable to the operating system of the mobile terminal, and the remote control instruction is used for remote control over the mobile terminal. The mobile terminal receives the remote control instruction sent by the remote control device, and because the operating system of the mobile terminal can recognize the remote control instruction, the operating system may execute an operation corresponding to the remote control instruction.

In this embodiment of the present invention, the remote control instruction may be input on the remote control device, and sent by the remote control device to the mobile terminal. For example, instruction code recognizable to the operating system of the mobile terminal is input on the remote control device, to serve as the remote control instruction, and the instruction code is sent by the remote control device to the mobile terminal so as to control the mobile terminal to perform a corresponding operation. Alternatively, a user-defined function key on the remote control device may be triggered so that a corresponding control instruction is sent to the mobile terminal, for example, when a volume key on the remote control device is triggered, a corresponding volume adjusting operation is also executed on the mobile terminal. Alternatively, a virtual screen of the mobile terminal may be generated on the remote control device, and when the virtual screen on the remote control device is touched or a user-defined touch event occurs, a corresponding instruction is sent to the mobile terminal.

After the mobile terminal receives the remote control instruction sent by the remote control device, the operating system of the mobile terminal recognizes the remote control instruction, and because the mobile terminal has acquired the system permission, the operating system of the mobile terminal may execute the operation corresponding to the remote control instruction, so that the remote control device controls the mobile terminal remotely. Specifically, a control application may be set or installed on the mobile terminal, and the system permission of the operating system of the mobile terminal may be acquired by using the control application; after the mobile terminal receives the remote control instruction from the remote control device, the control application that has acquired the system permission is used to send a control instruction to the operating system of the mobile terminal, and the mobile terminal executes an operation corresponding to the control instruction.

It should be noted that, the interaction between the remote control device and the mobile terminal by means of the control instruction does not involve data interaction, and the mobile terminal executes the corresponding operation according to the control instruction sent by the remote control device. For example, when the mobile terminal is mobile phone A, and the remote control device is mobile phone B, after mobile phone A establishes a connection to mobile phone B, a virtual screen of mobile phone A is generated on the screen of mobile phone B, and by touching the virtual screen on mobile phone B, for example, enabling an SMS function on the virtual screen, mobile phone B sends the control instruction to mobile phone A; mobile phone A automatically enables the SMS function on mobile phone A by using the operating system of mobile phone A, where all operations are executed on mobile phone A, and mobile phone A and mobile phone B interact with each other by means of instructions.

According to this embodiment of the present invention, after the mobile terminal establishes a connection to the remote control device, the mobile terminal receives a remote control instruction sent by the remote control device, and the operating system of the mobile terminal can recognize the remote control instruction, and can execute an operation corresponding to the remote control instruction on the basis of the acquired system permission, thereby implementing remote control over the mobile terminal, solving the problem that mobile terminals cannot be controlled remotely in the existing technology, and achieving an effect of controlling mobile terminals remotely.

One user is usually equipped with multiple mobile terminals, for example, a mobile phone, a tablet computer, and a smart watch. For example, user Y is equipped with a mobile phone and a tablet computer, but forgets to carry the mobile phone when going to work, and only puts the tablet computer in the briefcase. With the solution of this embodiment of the present invention, the tablet computer is used to control the mobile phone remotely; the tablet computer may be used to look up an address book of the mobile phone, hang up or answer phones, or control the mobile phone to send and receive SMS messages, thereby reducing impact on life and word when the user forgets to carry the mobile phone.

In one embodiment, after the mobile terminal establishes the connection to the remote control device, the remote control device may send a hardware parameter request to the mobile terminal, where the hardware parameter request is used for requesting the mobile terminal to send a hardware parameter of the mobile terminal, such as screen resolution of the mobile device, to the remote control device. The mobile terminal receives the hardware parameter request sent by the remote control device, so that the mobile terminal sends the hardware parameter to the remote control device in response to the request.

The mobile terminal may send, through Bluetooth, a WiFi network, a mobile network, or the Internet, the hardware parameter to the remote control device on the basis of the hardware parameter request. The remote control device receives the hardware parameter and generates a virtual screen of the mobile terminal on the basis of the hardware parameter, and the remote control device sends the remote control instruction to the mobile terminal by triggering the virtual screen. For example, the remote control device sends a request to the mobile terminal, to request a parameter about screen resolution of the mobile terminal, and after the mobile terminal sends the parameter to the remote control device, the remote control device generates, on the screen thereof, a virtual screen whose resolution is the same as the screen resolution of the mobile terminal; the mobile terminal may project the screen thereof to the remote control device through the IP connection, and the remote control device may send the remote control instruction to the mobile terminal by using the virtual screen or a user-defined touch event. For example, the remote control device enables a network service of the mobile terminal by means of touch on the virtual screen, and at the same time, the virtual screen is touched to open a network browser; the mobile terminal executes an operation to open the network browser, and projects the screen of the mobile terminal to the remote control device by using the IP connection.

According to the present invention, a virtual screen of the mobile terminal is generated on the remote control device, and a control instruction is sent to the mobile terminal by using the virtual screen, so that remote control over the mobile terminal can be implemented in a more intuitive manner, and it is easier to control the mobile terminal.

In one embodiment, the mobile terminal acquires the system permission by using a control application set on the mobile terminal, where the control application for acquiring the system permission is set on the mobile terminal. The control application may be an application set or installed on the mobile terminal, and the system permission of the mobile terminal is acquired by using the control application. The mobile terminal sends the remote control instruction to the operating system by using the control application; the operating system executes the operation corresponding to the remote control instruction on the basis of the system permission.

After the mobile terminal receives the remote control instruction from the remote control device, because the control application has acquired the system permission, the control application may send the remote control instruction to the operating system of the mobile terminal, and the operating system of the mobile terminal executes, on the basis of the system permission, the operation corresponding to the remote control instruction sent by the control application.

For example, when the mobile terminal is a mobile phone, the control application is a mobile phone manager, and the mobile phone manager is installed on the mobile phone. The mobile phone manager acquires the system permission of the mobile phone, for example, a root privilege, and after the mobile phone receives the remote control instruction, such as an instruction for enabling a network service, sent by the remote control device, the mobile phone manager may receive the instruction. Because the mobile phone manager has acquired the root privilege of the mobile phone, the mobile phone manager may send the control instruction of enabling the network service to the operating system of the mobile phone, and after receiving the instruction, the operating system of the mobile phone enables the network service.

According to this embodiment of the present invention, a control application is installed on the mobile terminal, and the control application is used to send the received remote control instruction to the operating system of the mobile terminal, thereby implementing remote control over the mobile terminal; the mobile terminal can be controlled flexibly by installing the control application, and the operating system of the mobile terminal does not need to be adjusted.

In one embodiment, the establishing, by the mobile terminal, a connection to the remote control device includes: receiving, by the mobile terminal, a connection request from the remote control device; authenticating, by the mobile terminal, the connection request; and establishing, by the mobile terminal, the connection to the remote control device in a form of an IP direct connection after the connection request passes the authentication performed by the mobile terminal.

The remote control device sends a connection request to the mobile terminal, and the mobile terminal receives the connection request sent by the remote control device, and authenticates the connection request, so as to determine whether to establish a connection to the remote control device; if the authentication succeeds, the mobile terminal establishes a connection to the remote control device, or if the authentication fails, the mobile terminal does not establish a connection to the remote control device. After the authentication performed by the mobile terminal succeeds, that is, after the mobile terminal determines to establish a connection to the remote control device, the mobile terminal may establish a connection to the remote control device in a form of an IP direct connection, and use a channel of the IP direct connection as a channel for control. The connection between the remote control device and the mobile terminal is established in the form of an IP direct connection, which can improve a transmission speed of the control instruction.

Figure 2:
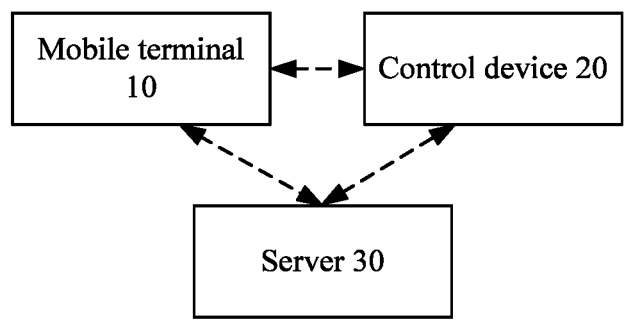
FIG. 2 is a schematic diagram of a preferred mobile terminal control system according to an embodiment of the present invention.

FIG. 2 is a schematic diagram of a preferred mobile terminal control system according to an embodiment of the present invention. As shown in FIG. 2, the mobile terminal control system further includes a server 30, where a remote control device 20 sends, to the server 30, a request for establishing a connection to a mobile terminal 10, the mobile terminal 10 uses the server 30 to authenticate the request from the remote control device 20, and after the request passes the authentication, the mobile terminal 10 establishes a connection to the remote control device 20 in a form of an IP direct connection.

The mobile terminal 10 may use the server 30 to authenticate the connection request from the remote control device 20. Before the mobile terminal 10 establishes the connection to the remote control device 20, both the mobile terminal 10 and the remote control device 20 may declare, to the server 30 by using a semi-persistent connection, that they are online. The remote control device 20 sends the connection request to the server 30, the mobile terminal 10 sends information for authentication to the server 30, and the server 30 is used to authenticate the connection request from the remote control device 20, to determine whether the connection request from the remote control device 20 is a request for establishing a connection to the mobile terminal 10. After the authentication succeeds, the mobile terminal 10 may be connected to the remote control device 20 in a form of an IP direct connection, and the connection between the mobile terminal 10 and the remote control device 20 may not pass through the server 30. With the server 30, because both the remote control device 20 and the mobile terminal 10 may declare to the server that they are online, the server may authenticate requests of multiple remote control devices for establishing connections to multiple mobile terminals, or may authenticate requests of one remote control device for establishing connections to multiple mobile terminals.

Figure 3:
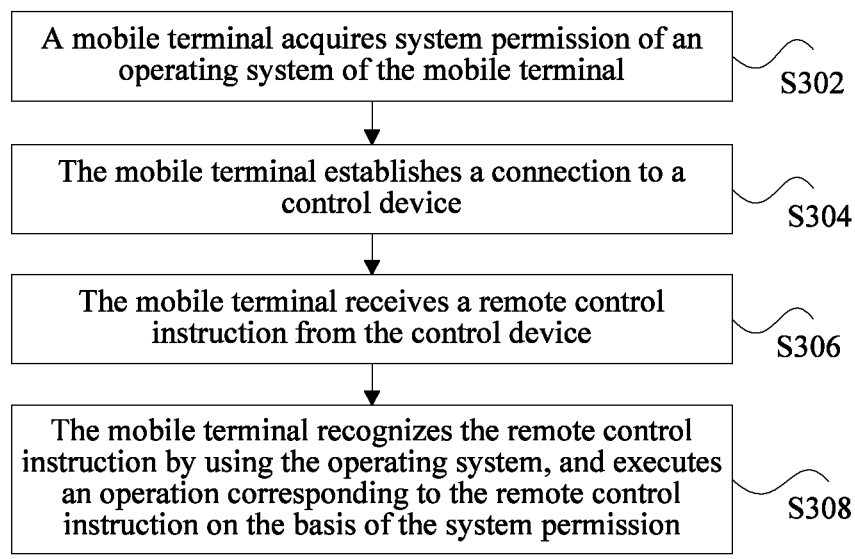
FIG. 3 is a flowchart of a mobile terminal control method according to a first embodiment of the present invention.

An embodiment of the present invention further provides a mobile terminal control method. The method may be applied to the mobile terminal in the embodiments of the present invention, and certainly, may also be applied to the mobile terminal control system in the embodiments of the present invention. FIG. 3 is a flowchart of a mobile terminal control method according to a first embodiment of the present invention. As shown in FIG. 3, the mobile terminal control method includes the following steps:

Step S302: A mobile terminal acquires system permission of an operating system of the mobile terminal.

The mobile terminal may be a mobile device such as a mobile phone or a tablet computer; the system permission may be system permission of an operating system installed on the mobile terminal, and the system permission may be used for controlling some or all functions of the mobile terminal, for example, the system permission is a root privilege of the mobile phone, where root is user account of a super administrator in a Linux system and a unix system, and this account has supremacy over the whole operating system and can operate all objects.

In this embodiment of the present invention, the system permission of the mobile terminal may be acquired in a system granting manner or a root privilege granting manner. The system granting manner refers to that: when a mobile terminal such as a mobile phone leaves factory, a vendor grants corresponding system permission to an application on the mobile terminal, so that the application on the mobile terminal can implement a simulated system response event after acquiring the system permission. The root privilege refers to that, on a mobile terminal that uses Android system as an operating system, a root privilege of the system may be acquired by using an application or program code when there is no system grant, so as to implement absolute control over the mobile terminal; or some control events may be simulated when there is no root privilege or system permission. The system permission of the operating system of the mobile terminal is acquired so as to control the mobile terminal on the basis of the permission.

Step S304: The mobile terminal establishes a connection to a remote control device.

The remote control device may be a device, such as a mobile phone, a tablet computer, a PC, or other terminal devices, for controlling the mobile terminal. The mobile terminal establishes a connection to the remote control device, to facilitate communication between the remote control device and the mobile terminal, so that the remote control device controls the mobile terminal. Specifically, the remote control device may send a connection request, and the mobile terminal receives the connection request from the remote control device, and authenticates the connection request. After the authentication succeeds, the mobile terminal may establish the connection to the remote control device in a form of an IP direct connection. After the connection is established, the IP direct connection may serve as a channel for control, and the remote control device sends a control instruction to the mobile terminal through the IP direct connection channel. Certainly, when establishing the connection to the remote control device, the mobile device may use a server to authenticate the connection request.

Step S306: The mobile terminal receives a remote control instruction from the remote control device.

After the mobile terminal establishes the connection to the remote control device, the remote control device may send a remote control instruction to the mobile terminal, where the remote control instruction is an instruction recognizable to the operating system of the mobile terminal, and the remote control instruction is used for remote control over the mobile terminal. The mobile terminal receives the remote control instruction sent by the remote control device, and because the operating system of the mobile terminal can recognize the remote control instruction, the operating system may execute an operation corresponding to the remote control instruction.

In this embodiment of the present invention, the remote control instruction may be input on the remote control device, and sent by the remote control device to the mobile terminal. For example, instruction code recognizable to the operating system of the mobile terminal is input on the remote control device, to serve as the remote control instruction, and the instruction code is sent by the remote control device to the mobile terminal so as to control the mobile terminal to perform a corresponding operation. Alternatively, a user-defined function key on the remote control device may be triggered so that a corresponding control instruction is sent to the mobile terminal, for example, when a volume key on the remote control device is triggered, a corresponding volume adjusting operation is also executed on the mobile terminal. Alternatively, a virtual screen of the mobile terminal may be generated on the remote control device, and when the virtual screen on the remote control device is touched or a user-defined touch event occurs, a corresponding instruction is sent to the mobile terminal.

Step S308: The mobile terminal recognizes the remote control instruction by using the operating system, and executes an operation corresponding to the remote control instruction on the basis of the system permission.

After the mobile terminal receives the remote control instruction sent by the remote control device, the operating system of the mobile terminal recognizes the remote control instruction, and because the mobile terminal has acquired the system permission, the operating system of the mobile terminal may execute the operation corresponding to the remote control instruction, so that the remote control device controls the mobile terminal remotely. Specifically, a control application may be set or installed on the mobile terminal, and the system permission of the operating system of the mobile terminal may be acquired by using the control application; after the mobile terminal receives the remote control instruction from the remote control device, the control application that has acquired the system permission is used to send a control instruction to the operating system of the mobile terminal, and the mobile terminal executes an operation corresponding to the control instruction.

It should be noted that, the interaction between the remote control device and the mobile terminal by means of the control instruction does not involve data interaction, and the mobile terminal executes the corresponding operation according to the control instruction sent by the remote control device. For example, when the mobile terminal is mobile phone A, and the remote control device is mobile phone B, after mobile phone A establishes a connection to mobile phone B, a virtual screen of mobile phone A is generated on the screen of mobile phone B, and by touching the virtual screen on mobile phone B, for example, enabling an SMS function on the virtual screen, mobile phone B sends the control instruction to mobile phone A; mobile phone A automatically enables the SMS function on mobile phone A by using the operating system of mobile phone A, where all operations are executed on mobile phone A, and mobile phone A and mobile phone B interact with each other by means of instructions.

According to this embodiment of the present invention, after the mobile terminal establishes a connection to the remote control device, the mobile terminal receives a remote control instruction sent by the remote control device, and the operating system of the mobile terminal can recognize the remote control instruction, and can execute an operation corresponding to the remote control instruction on the basis of the acquired system permission, thereby implementing remote control over the mobile terminal, solving the problem that mobile terminals cannot be controlled remotely in the existing technology, and achieving an effect of controlling mobile terminals remotely.

One user is usually equipped with multiple mobile terminals, for example, a mobile phone, a tablet computer, and a smart watch. For example, user Y is equipped with a mobile phone and a tablet computer, but forgets to carry the mobile phone when going to work, and only puts the tablet computer in the briefcase. With the solution of this embodiment of the present invention, the tablet computer is used to control the mobile phone remotely; the tablet computer may be used to look up an address book of the mobile phone, hang up or answer phones, or control the mobile phone to send and receive SMS messages, thereby reducing impact on life and word when the user forgets to carry the mobile phone.

Figure 4:
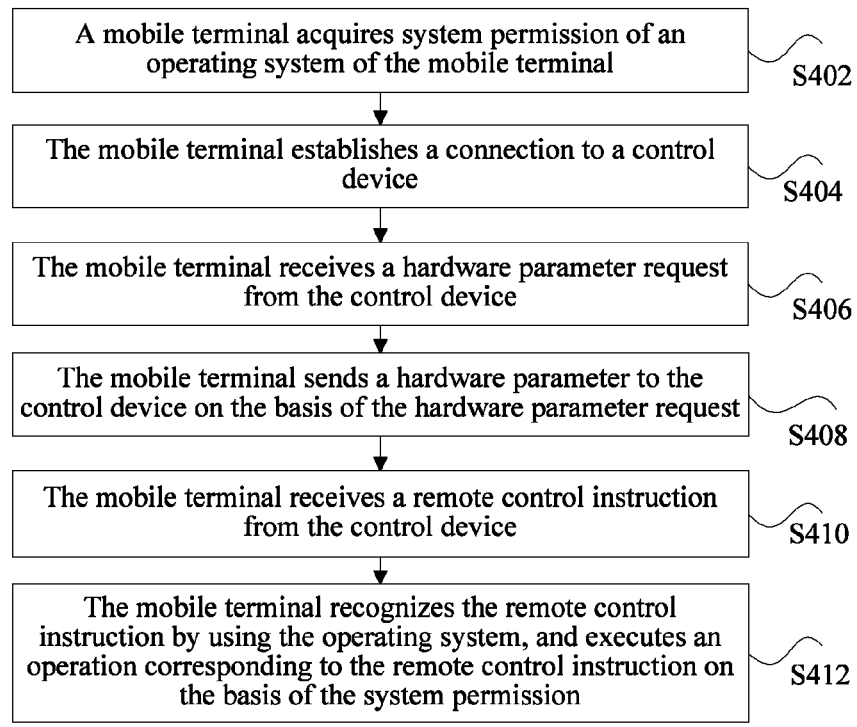
FIG. 4 is a flowchart of a preferred mobile terminal control method according to a first embodiment of the present invention.

FIG. 4 is a flowchart of a preferred mobile terminal control method according to a first embodiment of the present invention. The mobile terminal control method of this embodiment may be a preferred implementation manner of the mobile terminal control method in the foregoing embodiment. As shown in FIG. 4, the mobile terminal control method includes the following steps:

Step S402 and step S404 are separately the same as step S302 and step S304 shown in FIG. 3, and are not described herein again.

Step S406: The mobile terminal receives a hardware parameter request from the remote control device.

After the mobile terminal establishes the connection to the remote control device, the remote control device may send a hardware parameter request to the mobile terminal, where the hardware parameter request is used for requesting the mobile terminal to send a hardware parameter of the mobile terminal, such as screen resolution of the mobile device, to the remote control device. The mobile terminal receives the hardware parameter request sent by the remote control device, so that the mobile terminal sends the hardware parameter to the remote control device in response to the request.

Step S408: The mobile terminal sends a hardware parameter to the remote control device on the basis of the hardware parameter request.

The mobile terminal may send, through Bluetooth, a WiFi network, a mobile network, or the Internet, the hardware parameter to the remote control device on the basis of the hardware parameter request. The remote control device receives the hardware parameter and generates a virtual screen of the mobile terminal on the basis of the hardware parameter, and the remote control device sends the remote control instruction to the mobile terminal by triggering the virtual screen. For example, the remote control device sends a request to the mobile terminal, to request a parameter about screen resolution of the mobile terminal, and after the mobile terminal sends the parameter to the remote control device, the remote control device generates, on the screen thereof, a virtual screen whose resolution is the same as the screen resolution of the mobile terminal; the mobile terminal may project the screen thereof to the remote control device through the IP connection, and the remote control device may send the remote control instruction to the mobile terminal by using the virtual screen or a user-defined touch event. For example, the remote control device enables a network service of the mobile terminal by means of touch on the virtual screen, and at the same time, the virtual screen is touched to open a network browser; the mobile terminal executes an operation to open the network browser, and projects the screen of the mobile terminal to the remote control device by using the IP connection.

Step S410 and step S412 are separately the same as step S306 and step S308 shown in FIG. 3, and are not described herein again.

According to the present invention, a virtual screen of the mobile terminal is generated on the remote control device, and a control instruction is sent to the mobile terminal by using the virtual screen, so that remote control over the mobile terminal can be implemented in a more intuitive manner, and it is easier to control the mobile terminal.

In one embodiment, the acquiring, by a mobile terminal, system permission of an operating system of the mobile terminal includes: acquiring, by the mobile terminal, the system permission by using a control application set on the mobile terminal, where the control application for acquiring the system permission is set on the mobile terminal. The control application may be an application set or installed on the mobile terminal, and the system permission of the mobile terminal is acquired by using the control application. The recognizing, by the mobile terminal, the remote control instruction by using the operating system, and executing an operation corresponding to the remote control instruction on the basis of the system permission includes: sending, by the mobile terminal, the remote control instruction to the operating system by using the control application; and executing, by the operating system, the operation corresponding to the remote control instruction on the basis of the system permission.

After the mobile terminal receives the remote control instruction from the remote control device, because the control application has acquired the system permission, the control application may send the remote control instruction to the operating system of the mobile terminal, and the operating system of the mobile terminal executes, on the basis of the system permission, the operation corresponding to the remote control instruction sent by the control application.

For example, when the mobile terminal is a mobile phone, the control application is a mobile phone manager, and the mobile phone manager is installed on the mobile phone. The mobile phone manager acquires the system permission of the mobile phone, for example, a root privilege, and after the mobile phone receives the remote control instruction, such as an instruction for enabling a network service, sent by the remote control device, the mobile phone manager may receive the instruction. Because the mobile phone manager has acquired the root privilege of the mobile phone, the mobile phone manager may send the control instruction of enabling the network service to the operating system of the mobile phone, and after receiving the instruction, the operating system of the mobile phone enables the network service.

According to this embodiment of the present invention, a control application is installed on the mobile terminal, and the control application is used to send the received remote control instruction to the operating system of the mobile terminal, thereby implementing remote control over the mobile terminal; the mobile terminal can be controlled flexibly by installing the control application, and the operating system of the mobile terminal does not need to be adjusted.

In one embodiment, the establishing, by the mobile terminal, a connection to the remote control device includes: receiving, by the mobile terminal, a connection request from the remote control device; authenticating, by the mobile terminal, the connection request; and establishing, by the mobile terminal, the connection to the remote control device in a form of an IP direct connection after the connection request passes the authentication performed by the mobile terminal.

The remote control device sends a connection request to the mobile terminal, and the mobile terminal receives the connection request sent by the remote control device, and authenticates the connection request, so as to determine whether to establish a connection to the remote control device; if the authentication succeeds, the mobile terminal establishes a connection to the remote control device, or if the authentication fails, the mobile terminal does not establish a connection to the remote control device. After the authentication performed by the mobile terminal succeeds, that is, after the mobile terminal determines to establish a connection to the remote control device, the mobile terminal may establish a connection to the remote control device in a form of an IP direct connection, and use a channel of the IP direct connection as a channel for control. The connection between the remote control device and the mobile terminal is established in the form of an IP direct connection, which can improve a transmission speed of the control instruction.

Further, the mobile terminal may use a server to authenticate the connection request from the remote control device. Before the mobile terminal establishes the connection to the remote control device, both the mobile terminal and the remote control device may declare, to the server by using a semi-persistent connection, that they are online. The remote control device sends the connection request to the server, the mobile terminal sends information for authentication to the server, and the server is used to authenticate the connection request from the remote control device, to determine whether the connection request from the remote control device is a request for establishing a connection to the mobile terminal. After the authentication succeeds, the mobile terminal may be connected to the remote control device in a form of an IP direct connection, and the connection between the mobile terminal and the remote control device may not pass through the server. With the server, because both the remote control device and the mobile terminal may declare to the server that they are online, the server may authenticate requests of multiple remote control devices for establishing connections to multiple mobile terminals, or may authenticate requests of one remote control device for establishing connections to multiple mobile terminals.

Figure 5:
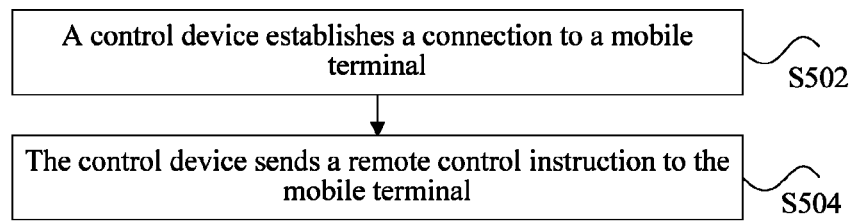
FIG. 5 is a flowchart of a mobile terminal control method according to a second embodiment of the present invention.

An embodiment of the present invention further provides a mobile terminal control method, where the method may be applied to the remote control device in the embodiments of the present invention, and certainly, may also be applied to the mobile terminal control system in the embodiments of the present invention. FIG. 5 is a flowchart of a mobile terminal control method according to a second embodiment of the present invention. As shown in FIG. 5, the mobile terminal control method includes the following steps:

Step S502: A remote control device establishes a connection to a mobile terminal. The mobile terminal is a terminal that acquires system permission of an operating system of its own.

The mobile terminal may be a mobile device such as a mobile phone or a tablet computer; the system permission may be system permission of an operating system installed on the mobile terminal, and the system permission may be used for controlling some or all functions of the mobile terminal, for example, the system permission is a root privilege of the mobile phone, where root is user account of a super administrator in a Linux system and a unix system, and this account has supremacy over the whole operating system and can operate all objects.

In this embodiment of the present invention, the system permission of the mobile terminal may be acquired in a system granting manner or a root privilege granting manner. The system granting manner refers to that: when a mobile terminal such as a mobile phone leaves factory, a vendor grants corresponding system permission to an application on the mobile terminal, so that the application on the mobile terminal can implement a simulated system response event after acquiring the system permission. The root privilege refers to that, on a mobile terminal that uses Android system as an operating system, a root privilege of the system may be acquired by using an application or program code when there is no system grant, so as to implement absolute control over the mobile terminal; or some control events may be simulated when there is no root privilege or system permission. The system permission of the operating system of the mobile terminal is acquired so as to control the mobile terminal on the basis of the permission.

The remote control device may be a device, such as a mobile phone, a tablet computer, a PC, or other terminal devices, for controlling the mobile terminal. The remote control device establishes a connection to the mobile terminal, to facilitate communication between the remote control device and the mobile terminal, so that the remote control device controls the mobile terminal remotely. Specifically, the remote control device may send a connection request, and the mobile terminal receives the connection request from the remote control device, and authenticates the connection request. After the authentication succeeds, the mobile terminal may establish the connection to the remote control device in a form of an IP direct connection. After the connection is established, the IP direct connection may serve as a channel for control, and the remote control device sends a control instruction to the mobile terminal through the IP direct connection channel. Certainly, when establishing the connection to the remote control device, the mobile device may use a server to authenticate the connection request.

Step S504: The remote control device sends a remote control instruction to the mobile terminal. The remote control instruction is an instruction recognizable to the operating system of the mobile terminal, and the remote control instruction is used for remote control over the mobile terminal; the mobile terminal recognizes the remote control instruction by using the operating system, and executes an operation corresponding to the remote control instruction on the basis of the system permission.

After the remote control device establishes the connection to the mobile terminal, the remote control device may send a remote control instruction to the mobile terminal, where the remote control instruction is an instruction recognizable to the operating system of the mobile terminal, and the remote control instruction is used for remote control over the mobile terminal. The mobile terminal receives the remote control instruction sent by the remote control device, and because the operating system of the mobile terminal can recognize the remote control instruction, the operating system may execute an operation corresponding to the remote control instruction.

In this embodiment of the present invention, the remote control instruction may be input on the remote control device, and sent by the remote control device to the mobile terminal. For example, instruction code recognizable to the operating system of the mobile terminal is input on the remote control device, to serve as the remote control instruction, and the instruction code is sent by the remote control device to the mobile terminal so as to control the mobile terminal to perform a corresponding operation. Alternatively, a user-defined function key on the remote control device may be triggered so that a corresponding control instruction is sent to the mobile terminal, for example, when a volume key on the remote control device is triggered, a corresponding volume adjusting operation is also executed on the mobile terminal. Alternatively, a virtual screen of the mobile terminal may be generated on the remote control device, and when the virtual screen on the remote control device is touched or a user-defined touch event occurs, a corresponding instruction is sent to the mobile terminal.

After the mobile terminal receives the remote control instruction sent by the remote control device, the operating system of the mobile terminal recognizes the remote control instruction, and because the mobile terminal has acquired the system permission, the operating system of the mobile terminal may execute the operation corresponding to the remote control instruction, so that the remote control device controls the mobile terminal remotely. Specifically, a control application may be set or installed on the mobile terminal, and the system permission of the operating system of the mobile terminal may be acquired by using the control application; after the mobile terminal receives the remote control instruction from the remote control device, the control application that has acquired the system permission is used to send a control instruction to the operating system of the mobile terminal, and the mobile terminal executes an operation corresponding to the control instruction.

It should be noted that, the interaction between the remote control device and the mobile terminal by means of the control instruction does not involve data interaction, and the mobile terminal executes the corresponding operation according to the control instruction sent by the remote control device. For example, when the mobile terminal is mobile phone A, and the remote control device is mobile phone B, after mobile phone A establishes a connection to mobile phone B, a virtual screen of mobile phone A is generated on the screen of mobile phone B, and by touching the virtual screen on mobile phone B, for example, enabling an SMS function on the virtual screen, mobile phone B sends the control instruction to mobile phone A; mobile phone A automatically enables the SMS function on mobile phone A by using the operating system of mobile phone A, where all operations are executed on mobile phone A, and mobile phone A and mobile phone B interact with each other by means of instructions.

According to this embodiment of the present invention, after the remote control device establishes a connection to the mobile terminal, the mobile terminal receives a remote control instruction sent by the remote control device, and the operating system of the mobile terminal can recognize the remote control instruction, and can execute an operation corresponding to the remote control instruction on the basis of the acquired system permission, thereby implementing remote control over the mobile terminal, solving the problem that mobile terminals cannot be controlled remotely in the existing technology, and achieving an effect of controlling mobile terminals remotely.

In one embodiment, after the remote control device establishes the connection to the mobile terminal, the mobile terminal control method of this embodiment further includes the following steps:

Step 1: The remote control device sends a hardware parameter request to the mobile terminal, where the hardware parameter request is used for requesting the mobile terminal to send a hardware parameter of the mobile terminal to the remote control device, and the mobile terminal sends the hardware parameter to the remote control device on the basis of the hardware parameter request.

The remote control device may send a hardware parameter request to the mobile terminal, where the hardware parameter request is used for requesting the mobile terminal to send a hardware parameter of the mobile terminal, such as screen resolution of the mobile device, to the remote control device. The mobile terminal receives the hardware parameter request sent by the remote control device, so that the mobile terminal sends the hardware parameter to the remote control device in response to the request.

Step 2: The remote control device receives the hardware parameter.

Step 3: The remote control device generates a virtual screen of the mobile terminal on the basis of the hardware parameter, where the remote control device sends the remote control instruction to the mobile terminal by triggering the virtual screen.

After receiving the hardware parameter request, the mobile terminal may send, through Bluetooth, a WiFi network, a mobile network, or the Internet, the hardware parameter to the remote control device on the basis of the hardware parameter request. The remote control device receives the hardware parameter and generates a virtual screen of the mobile terminal on the basis of the hardware parameter, and the remote control device sends the remote control instruction to the mobile terminal by triggering the virtual screen. For example, the remote control device sends a request to the mobile terminal, to request a parameter about screen resolution of the mobile terminal, and after the mobile terminal sends the parameter to the remote control device, the remote control device generates, on the screen thereof, a virtual screen whose resolution is the same as the screen resolution of the mobile terminal; the mobile terminal may project the screen thereof to the remote control device through the IP connection, and the remote control device may send the remote control instruction to the mobile terminal by using the virtual screen or a user-defined touch event. For example, the remote control device enables a network service of the mobile terminal by means of touch on the virtual screen, and at the same time, the virtual screen is touched to open a network browser; the mobile terminal executes an operation to open the network browser, and projects the screen of the mobile terminal to the remote control device by using the IP connection.

According to the present invention, a virtual screen of the mobile terminal is generated on the remote control device, and a control instruction is sent to the mobile terminal by using the virtual screen, so that remote control over the mobile terminal can be implemented in a more intuitive manner, and it is easier to control the mobile terminal.

In this embodiment of the present invention, the mobile terminal may acquire the system permission by using a control application set on the mobile terminal, where the control application for acquiring the system permission is set on the mobile terminal. The control application may be an application set or installed on the mobile terminal, and the system permission of the mobile terminal is acquired by using the control application. The mobile terminal sends the remote control instruction to the operating system by using the control application; the operating system of the mobile terminal executes the operation corresponding to the remote control instruction on the basis of the system permission.

After the mobile terminal receives the remote control instruction from the remote control device, because the control application has acquired the system permission, the control application may send the remote control instruction to the operating system of the mobile terminal, and the operating system of the mobile terminal executes, on the basis of the system permission, the operation corresponding to the remote control instruction sent by the control application.

For example, when the mobile terminal is a mobile phone, the control application is a mobile phone manager, and the mobile phone manager is installed on the mobile phone. The mobile phone manager acquires the system permission of the mobile phone, for example, a root privilege, and after the mobile phone receives the remote control instruction, such as an instruction for enabling a network service, sent by the remote control device, the mobile phone manager may receive the instruction. Because the mobile phone manager has acquired the root privilege of the mobile phone, the mobile phone manager may send the control instruction of enabling the network service to the operating system of the mobile phone, and after receiving the instruction, the operating system of the mobile phone enables the network service.

According to this embodiment of the present invention, a control application is installed on the mobile terminal, and the control application is used to send the received remote control instruction to the operating system of the mobile terminal, thereby implementing remote control over the mobile terminal; the mobile terminal can be controlled flexibly by installing the control application, and the operating system of the mobile terminal does not need to be adjusted.

In one embodiment, the establishing, by a remote control device, a connection to a mobile terminal includes: sending, by the remote control device, a connection request to the mobile terminal, where the mobile terminal receives the connection request from the remote control device and authenticates the connection request; and establishing, by the remote control device, the connection to the mobile terminal in a form of an IP direct connection after the connection request passes the authentication performed by the mobile terminal.

The remote control device sends a connection request to the mobile terminal, and the mobile terminal receives the connection request sent by the remote control device, and authenticates the connection request, so as to determine whether to establish a connection to the remote control device; if the authentication succeeds, the mobile terminal establishes a connection to the remote control device, or if the authentication fails, the mobile terminal does not establish a connection to the remote control device. After the authentication performed by the mobile terminal succeeds, that is, after the mobile terminal determines to establish a connection to the remote control device, the mobile terminal may establish a connection to the remote control device in a form of an IP direct connection, and use a channel of the IP direct connection as a channel for control. The connection between the remote control device and the mobile terminal is established in the form of an IP direct connection, which can improve a transmission speed of the control instruction.

Further, the mobile terminal may use a server to authenticate the connection request from the remote control device. Before the mobile terminal establishes the connection to the remote control device, both the mobile terminal and the remote control device may declare, to the server by using a semi-persistent connection, that they are online. The remote control device sends the connection request to the server, the mobile terminal sends information for authentication to the server, and the server is used to authenticate the connection request from the remote control device, to determine whether the connection request from the remote control device is a request for establishing a connection to the mobile terminal. After the authentication succeeds, the mobile terminal may be connected to the remote control device in a form of an IP direct connection, and the connection between the mobile terminal and the remote control device may not pass through the server. With the server, because both the remote control device and the mobile terminal may declare to the server that they are online, the server may authenticate requests of multiple remote control devices for establishing connections to multiple mobile terminals, or may authenticate requests of one remote control device for establishing connections to multiple mobile terminals.

This embodiment of the present invention provides a mobile terminal control apparatus; the apparatus can implement functions thereof by using the mobile terminal of the embodiments of the present invention, and the apparatus may be applied to the mobile terminal control system of the embodiments of the present invention. It should be noted that, the mobile terminal control apparatus according to this embodiment of the present invention may be applied to the mobile terminal control method of the first embodiment of the present invention, and the mobile terminal control method of the first embodiment of the present invention may also be executed by the mobile terminal control apparatus of this embodiment of the present invention.

Figure 6:
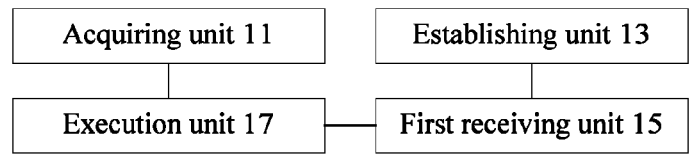
FIG. 6 is a schematic diagram of a mobile terminal control apparatus according to a first embodiment of the present invention.

FIG. 6 is a schematic diagram of a mobile terminal control apparatus according to a first embodiment of the present invention. As shown in FIG. 6, the mobile terminal control apparatus includes an acquiring unit 11, an establishing unit 13, a first receiving unit 15, and an execution unit 17.

The acquiring unit 11 is configured to enable a mobile terminal to acquire system permission of an operating system of the mobile terminal.

The mobile terminal may be a mobile device such as a mobile phone or a tablet computer; the system permission may be system permission of an operating system installed on the mobile terminal, and the system permission may be used for controlling some or all functions of the mobile terminal, for example, the system permission is a root privilege of the mobile phone, where root is user account of a super administrator in a Linux system and a unix system, and this account has supremacy over the whole operating system and can operate all objects.

In this embodiment of the present invention, the system permission of the mobile terminal may be acquired in a system granting manner or a root privilege granting manner. The system granting manner refers to that: when a mobile terminal such as a mobile phone leaves factory, a vendor grants corresponding system permission to an application on the mobile terminal, so that the application on the mobile terminal can implement a simulated system response event after acquiring the system permission. The root privilege refers to that, on a mobile terminal that uses Android system as an operating system, a root privilege of the system may be acquired by using an application or program code when there is no system grant, so as to implement absolute control over the mobile terminal; or some control events may be simulated when there is no root privilege or system permission. The acquiring unit 11 acquires the system permission of the operating system of the mobile terminal so as to control the mobile terminal on the basis of the permission.

The establishing unit 13 is configured to enable the mobile terminal to establish a connection to a remote control device.

The remote control device may be a device, such as a mobile phone, a tablet computer, a PC, or other terminal devices, for controlling the mobile terminal. The establishing unit 13 may be a unit set on the mobile terminal, and is configured to enable the mobile terminal to establish a connection to the remote control device, to facilitate communication between the remote control device and the mobile terminal, so that the remote control device controls the mobile terminal. Specifically, the remote control device may send a connection request, and the mobile terminal receives the connection request from the remote control device, and authenticates the connection request. After the authentication succeeds, the mobile terminal may establish the connection to the remote control device in a form of an IP direct connection. After the connection is established, the IP direct connection may serve as a channel for control, and the remote control device sends a control instruction to the mobile terminal through the IP direct connection channel. Certainly, when establishing the connection to the remote control device, the mobile device may use a server to authenticate the connection request.

The first receiving unit 15 is configured to enable the mobile terminal to receive a remote control instruction from the remote control device.

After the mobile terminal establishes the connection to the remote control device, the remote control device may send a remote control instruction to the mobile terminal, where the remote control instruction is an instruction recognizable to the operating system of the mobile terminal, and the remote control instruction is used for remote control over the mobile terminal. The first receiving unit 15 receives the remote control instruction sent by the remote control device. The first receiving unit 15 may be a unit set on the mobile terminal. Because the operating system of the mobile terminal can recognize the remote control instruction, the operating system can execute an operation corresponding to the remote control instruction.

In this embodiment of the present invention, the remote control instruction may be input on the remote control device, and sent by the remote control device to the mobile terminal. For example, instruction code recognizable to the operating system of the mobile terminal is input on the remote control device, to serve as the remote control instruction, and the instruction code is sent by the remote control device to the mobile terminal so as to control the mobile terminal to perform a corresponding operation. Alternatively, a user-defined function key on the remote control device may be triggered so that a corresponding control instruction is sent to the mobile terminal, for example, when a volume key on the remote control device is triggered, a corresponding volume adjusting operation is also executed on the mobile terminal. Alternatively, a virtual screen of the mobile terminal may be generated on the remote control device, and when the virtual screen on the remote control device is touched or a user-defined touch event occurs, a corresponding instruction is sent to the mobile terminal.

The execution unit 17 is configured to enable the mobile terminal to recognize the remote control instruction by using the operating system and execute an operation corresponding to the remote control instruction on the basis of the system permission.

After the mobile terminal receives the remote control instruction sent by the remote control device, the execution unit 17 set on the mobile terminal recognizes the remote control instruction, and because the mobile terminal has acquired the system permission, the operating system of the mobile terminal may execute the operation corresponding to the remote control instruction, so that the remote control device controls the mobile terminal remotely. Specifically, a control application may be set or installed on the mobile terminal, and the system permission of the operating system of the mobile terminal may be acquired by using the control application; after the mobile terminal receives the remote control instruction from the remote control device, the control application that has acquired the system permission is used to send a control instruction to the operating system of the mobile terminal, and the mobile terminal executes an operation corresponding to the control instruction.

It should be noted that, the interaction between the remote control device and the mobile terminal by means of the control instruction does not involve data interaction, and the mobile terminal executes the corresponding operation according to the control instruction sent by the remote control device. For example, when the mobile terminal is mobile phone A, and the remote control device is mobile phone B, after mobile phone A establishes a connection to mobile phone B, a virtual screen of mobile phone A is generated on the screen of mobile phone B, and by touching the virtual screen on mobile phone B, for example, enabling an SMS function on the virtual screen, mobile phone B sends the control instruction to mobile phone A; mobile phone A automatically enables the SMS function on mobile phone A by using the operating system of mobile phone A, where all operations are executed on mobile phone A, and mobile phone A and mobile phone B interact with each other by means of instructions.

According to this embodiment of the present invention, after the mobile terminal establishes a connection to the remote control device, the mobile terminal receives a remote control instruction sent by the remote control device, and the operating system of the mobile terminal can recognize the remote control instruction, and can execute an operation corresponding to the remote control instruction on the basis of the acquired system permission, thereby implementing remote control over the mobile terminal, solving the problem that mobile terminals cannot be controlled remotely in the existing technology, and achieving an effect of controlling mobile terminals remotely.

In one embodiment, the mobile terminal control apparatus according to this embodiment of the present invention further includes a second receiving unit and a sending unit.

The second receiving unit is configured to enable the mobile terminal to receive a hardware parameter request from the remote control device after the mobile terminal establishes the connection to the remote control device.

After the mobile terminal establishes the connection to the remote control device, the remote control device may send a hardware parameter request to the mobile terminal, where the hardware parameter request is used for requesting the mobile terminal to send a hardware parameter of the mobile terminal, such as screen resolution of the mobile device, to the remote control device. The mobile terminal receives the hardware parameter request sent by the remote control device, so that the mobile terminal sends the hardware parameter to the remote control device in response to the request.

The sending unit is configured to enable the mobile terminal to send a hardware parameter to the remote control device on the basis of the hardware parameter request.

The mobile terminal may send, through Bluetooth, a WiFi network, a mobile network, or the Internet, the hardware parameter to the remote control device on the basis of the hardware parameter request. The remote control device receives the hardware parameter and generates a virtual screen of the mobile terminal on the basis of the hardware parameter, and the remote control device sends the remote control instruction to the mobile terminal by triggering the virtual screen. For example, the remote control device sends a request to the mobile terminal, to request a parameter about screen resolution of the mobile terminal, and after the mobile terminal sends the parameter to the remote control device, the remote control device generates, on the screen thereof, a virtual screen whose resolution is the same as the screen resolution of the mobile terminal; the mobile terminal may project the screen thereof to the remote control device through the IP connection, and the remote control device may send the remote control instruction to the mobile terminal by using the virtual screen or a user-defined touch event. For example, the remote control device enables a network service of the mobile terminal by means of touch on the virtual screen, and at the same time, the virtual screen is touched to open a network browser; the mobile terminal executes an operation to open the network browser, and projects the screen of the mobile terminal to the remote control device by using the IP connection.

According to the present invention, a virtual screen of the mobile terminal is generated on the remote control device, and a control instruction is sent to the mobile terminal by using the virtual screen, so that remote control over the mobile terminal can be implemented in a more intuitive manner, and it is easier to control the mobile terminal.

In one embodiment, the acquiring unit 11 according to this embodiment of the present invention includes an acquiring module, and the acquiring module is configure to enable the mobile terminal to acquire the system permission by using a control application set on the mobile terminal, where the control application for acquiring the system permission is set on the mobile terminal. The control application may be an application set or installed on the mobile terminal, and the system permission of the mobile terminal is acquired by using the control application.

The execution unit 17 includes a sending module and an execution module. The sending module is configured to enable the mobile terminal to send the remote control instruction to the operating system by using the control application; the execution module is configured to enable the operating system to execute the operation corresponding to the remote control instruction on the basis of the system permission.

After the mobile terminal receives the remote control instruction from the remote control device, because the control application has acquired the system permission, the control application may send the remote control instruction to the operating system of the mobile terminal, and the operating system of the mobile terminal executes, on the basis of the system permission, the operation corresponding to the remote control instruction sent by the control application.

For example, when the mobile terminal is a mobile phone, the control application is a mobile phone manager, and the mobile phone manager is installed on the mobile phone. The mobile phone manager acquires the system permission of the mobile phone, for example, a root privilege, and after the mobile phone receives the remote control instruction, such as an instruction for enabling a network service, sent by the remote control device, the mobile phone manager may receive the instruction. Because the mobile phone manager has acquired the root privilege of the mobile phone, the mobile phone manager may send the control instruction of enabling the network service to the operating system of the mobile phone, and after receiving the instruction, the operating system of the mobile phone enables the network service.

According to this embodiment of the present invention, a control application is installed on the mobile terminal, and the control application is used to send the received remote control instruction to the operating system of the mobile terminal, thereby implementing remote control over the mobile terminal; the mobile terminal can be controlled flexibly by installing the control application, and the operating system of the mobile terminal does not need to be adjusted.

In one embodiment, the establishing unit 13 includes a receiving module, an authentication module, and an establishing module.

The receiving module is configured to enable the mobile terminal to receive an authentication request from the remote control device. The authentication module is configured to enable the mobile terminal to authenticate the remote control device on the basis of the authentication request. The establishing module is configured to enable the mobile terminal to establish the connection to the remote control device in a form of an IP direct connection after the remote control device passes the authentication performed by the mobile terminal.

The remote control device sends a connection request to the mobile terminal, and the mobile terminal receives the connection request sent by the remote control device, and authenticates the connection request, so as to determine whether to establish a connection to the remote control device; if the authentication succeeds, the mobile terminal establishes a connection to the remote control device, or if the authentication fails, the mobile terminal does not establish a connection to the remote control device. After the authentication performed by the mobile terminal succeeds, that is, after the mobile terminal determines to establish a connection to the remote control device, the mobile terminal may establish a connection to the remote control device in a form of an IP direct connection, and use a channel of the IP direct connection as a channel for control. The connection between the remote control device and the mobile terminal is established in the form of an IP direct connection, which can improve a transmission speed of the control instruction.

Further, the mobile terminal may use a server to authenticate the connection request from the remote control device. Before the mobile terminal establishes the connection to the remote control device, both the mobile terminal and the remote control device may declare, to the server by using a semi-persistent connection, that they are online. The remote control device sends the connection request to the server, the mobile terminal sends information for authentication to the server, and the server is used to authenticate the connection request from the remote control device, to determine whether the connection request from the remote control device is a request for establishing a connection to the mobile terminal. After the authentication succeeds, the mobile terminal may be connected to the remote control device in a form of an IP direct connection, and the connection between the mobile terminal and the remote control device may not pass through the server. With the server, because both the remote control device and the mobile terminal may declare to the server that they are online, the server may authenticate requests of multiple remote control devices for establishing connections to multiple mobile terminals, or may authenticate requests of one remote control device for establishing connections to multiple mobile terminals.

This embodiment of the present invention further provides a mobile terminal control apparatus; the apparatus can implement functions thereof by using the remote control device of the embodiments of the present invention, and the apparatus may be applied to the mobile terminal control system of the embodiments of the present invention. It should be noted that, the mobile terminal control apparatus according to this embodiment of the present invention may be applied to the mobile terminal control method of the second embodiment of the present invention, and the mobile terminal control method of the second embodiment of the present invention may also be executed by the mobile terminal control apparatus of this embodiment of the present invention.

Figure 7:
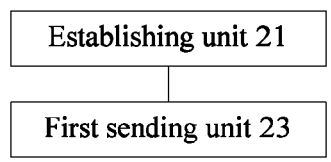
FIG. 7 is a schematic diagram of a mobile terminal control apparatus according to a second embodiment of the present invention.

FIG. 7 is a schematic diagram of a mobile terminal control apparatus according to a second embodiment of the present invention. As shown in FIG. 7, the mobile terminal control apparatus includes an establishing unit 21 and a first sending unit 23.

The establishing unit 21 is configured to enable a remote control device to establish a connection to a mobile terminal, where the mobile terminal is a terminal that acquires system permission of an operating system of its own.

The mobile terminal may be a mobile device such as a mobile phone or a tablet computer; the system permission may be system permission of an operating system installed on the mobile terminal, and the system permission may be used for controlling some or all functions of the mobile terminal, for example, the system permission is a root privilege of the mobile phone, where root is user account of a super administrator in a Linux system and a unix system, and this account has supremacy over the whole operating system and can operate all objects.

In this embodiment of the present invention, the system permission of the mobile terminal may be acquired in a system granting manner or a root privilege granting manner. The system granting manner refers to that: when a mobile terminal such as a mobile phone leaves factory, a vendor grants corresponding system permission to an application on the mobile terminal, so that the application on the mobile terminal can implement a simulated system response event after acquiring the system permission. The root privilege refers to that, on a mobile terminal that uses Android system as an operating system, a root privilege of the system may be acquired by using an application or program code when there is no system grant, so as to implement absolute control over the mobile terminal; or some control events may be simulated when there is no root privilege or system permission. The system permission of the operating system of the mobile terminal is acquired so as to control the mobile terminal on the basis of the permission.

The remote control device may be a device, such as a mobile phone, a tablet computer, a PC, or other terminal devices, for controlling the mobile terminal. The establishing unit 21 is configured enable the remote control device establishes a connection to the mobile terminal, to facilitate communication between the remote control device and the mobile terminal, so that the remote control device controls the mobile terminal remotely. Specifically, the remote control device may send a connection request, and the mobile terminal receives the connection request from the remote control device, and authenticates the connection request. After the authentication succeeds, the mobile terminal may establish the connection to the remote control device in a form of an IP direct connection. After the connection is established, the IP direct connection may serve as a channel for control, and the remote control device sends a control instruction to the mobile terminal through the IP direct connection channel. Certainly, when establishing the connection to the remote control device, the mobile device may use a server to authenticate the connection request.

The sending unit 23 is configured to enable the remote control device to send a remote control instruction to the mobile terminal, where the remote control instruction is an instruction recognizable to the operating system of the mobile terminal, the remote control instruction is used for remote control over the mobile terminal, and the mobile terminal recognizes the remote control instruction by using the operating system, and executes an operation corresponding to the remote control instruction on the basis of the system permission.

After the remote control device establishes the connection to the mobile terminal, the remote control device may send a remote control instruction to the mobile terminal, where the remote control instruction is an instruction recognizable to the operating system of the mobile terminal, and the remote control instruction is used for remote control over the mobile terminal. The mobile terminal receives the remote control instruction sent by the remote control device, and because the operating system of the mobile terminal can recognize the remote control instruction, the operating system may execute an operation corresponding to the remote control instruction.

In this embodiment of the present invention, the remote control instruction may be input on the remote control device, and sent by the remote control device to the mobile terminal. For example, instruction code recognizable to the operating system of the mobile terminal is input on the remote control device, to serve as the remote control instruction, and the instruction code is sent by the remote control device to the mobile terminal so as to control the mobile terminal to perform a corresponding operation. Alternatively, a user-defined function key on the remote control device may be triggered so that a corresponding control instruction is sent to the mobile terminal, for example, when a volume key on the remote control device is triggered, a corresponding volume adjusting operation is also executed on the mobile terminal. Alternatively, a virtual screen of the mobile terminal may be generated on the remote control device, and when the virtual screen on the remote control device is touched or a user-defined touch event occurs, a corresponding instruction is sent to the mobile terminal.

After the mobile terminal receives the remote control instruction sent by the remote control device, the operating system of the mobile terminal recognizes the remote control instruction, and because the mobile terminal has acquired the system permission, the operating system of the mobile terminal may execute the operation corresponding to the remote control instruction, so that the remote control device controls the mobile terminal remotely. Specifically, a control application may be set or installed on the mobile terminal, and the system permission of the operating system of the mobile terminal may be acquired by using the control application; after the mobile terminal receives the remote control instruction from the remote control device, the control application that has acquired the system permission is used to send a control instruction to the operating system of the mobile terminal, and the mobile terminal executes an operation corresponding to the control instruction.

It should be noted that, the interaction between the remote control device and the mobile terminal by means of the control instruction does not involve data interaction, and the mobile terminal executes the corresponding operation according to the control instruction sent by the remote control device. For example, when the mobile terminal is mobile phone A, and the remote control device is mobile phone B, after mobile phone A establishes a connection to mobile phone B, a virtual screen of mobile phone A is generated on the screen of mobile phone B, and by touching the virtual screen on mobile phone B, for example, enabling an SMS function on the virtual screen, mobile phone B sends the control instruction to mobile phone A; mobile phone A automatically enables the SMS function on mobile phone A by using the operating system of mobile phone A, where all operations are executed on mobile phone A, and mobile phone A and mobile phone B interact with each other by means of instructions.

According to this embodiment of the present invention, after the remote control device establishes a connection to the mobile terminal, the mobile terminal receives a remote control instruction sent by the remote control device, and the operating system of the mobile terminal can recognize the remote control instruction, and can execute an operation corresponding to the remote control instruction on the basis of the acquired system permission, thereby implementing remote control over the mobile terminal, solving the problem that mobile terminals cannot be controlled remotely in the existing technology, and achieving an effect of controlling mobile terminals remotely.

In one embodiment, the mobile terminal control apparatus further includes a second sending unit, a receiving unit, and a generating unit.

The sending unit is configured to enable the remote control device to send a hardware parameter request to the mobile terminal after the remote control device establishes the connection to the mobile terminal, where the hardware parameter request is used for requesting the mobile terminal to send a hardware parameter to the mobile terminal of the remote control device, and the mobile terminal sends a hardware parameter to the remote control device on the basis of the hardware parameter request.

The remote control device may send a hardware parameter request to the mobile terminal, where the hardware parameter request is used for requesting the mobile terminal to send a hardware parameter of the mobile terminal, such as screen resolution of the mobile device, to the remote control device. The mobile terminal receives the hardware parameter request sent by the remote control device, so that the mobile terminal sends the hardware parameter to the remote control device in response to the request.

The receiving unit is configured to enable the remote control device to receive the hardware parameter.

The generating unit is configured to enable the remote control device to generate a virtual screen of the mobile terminal on the basis of the hardware parameter, where the remote control device sends the remote control instruction to the mobile terminal by triggering the virtual screen.

After receiving the hardware parameter request, the mobile terminal may send, through Bluetooth, a WiFi network, a mobile network, or the Internet, the hardware parameter to the remote control device on the basis of the hardware parameter request. The remote control device receives the hardware parameter and generates a virtual screen of the mobile terminal on the basis of the hardware parameter, and the remote control device sends the remote control instruction to the mobile terminal by triggering the virtual screen. For example, the remote control device sends a request to the mobile terminal, to request a parameter about screen resolution of the mobile terminal, and after the mobile terminal sends the parameter to the remote control device, the remote control device generates, on the screen thereof, a virtual screen whose resolution is the same as the screen resolution of the mobile terminal; the mobile terminal may project the screen thereof to the remote control device through the IP connection, and the remote control device may send the remote control instruction to the mobile terminal by using the virtual screen or a user-defined touch event. For example, the remote control device enables a network service of the mobile terminal by means of touch on the virtual screen, and at the same time, the virtual screen is touched to open a network browser; the mobile terminal executes an operation to open the network browser, and projects the screen of the mobile terminal to the remote control device by using the IP connection.

According to the present invention, a virtual screen of the mobile terminal is generated on the remote control device, and a control instruction is sent to the mobile terminal by using the virtual screen, so that remote control over the mobile terminal can be implemented in a more intuitive manner, and it is easier to control the mobile terminal.

In this embodiment of the present invention, the mobile terminal may acquire the system permission by using a control application set on the mobile terminal, where the control application for acquiring the system permission is set on the mobile terminal. The control application may be an application set or installed on the mobile terminal, and the system permission of the mobile terminal is acquired by using the control application. The mobile terminal sends the remote control instruction to the operating system by using the control application; the operating system of the mobile terminal executes the operation corresponding to the remote control instruction on the basis of the system permission.

After the mobile terminal receives the remote control instruction from the remote control device, because the control application has acquired the system permission, the control application may send the remote control instruction to the operating system of the mobile terminal, and the operating system of the mobile terminal executes, on the basis of the system permission, the operation corresponding to the remote control instruction sent by the control application.

For example, when the mobile terminal is a mobile phone, the control application is a mobile phone manager, and the mobile phone manager is installed on the mobile phone. The mobile phone manager acquires the system permission of the mobile phone, for example, a root privilege, and after the mobile phone receives the remote control instruction, such as an instruction for enabling a network service, sent by the remote control device, the mobile phone manager may receive the instruction. Because the mobile phone manager has acquired the root privilege of the mobile phone, the mobile phone manager may send the control instruction of enabling the network service to the operating system of the mobile phone, and after receiving the instruction, the operating system of the mobile phone enables the network service.

According to this embodiment of the present invention, a control application is installed on the mobile terminal, and the control application is used to send the received remote control instruction to the operating system of the mobile terminal, thereby implementing remote control over the mobile terminal; the mobile terminal can be controlled flexibly by installing the control application, and the operating system of the mobile terminal does not need to be adjusted.

In one embodiment, the establishing unit 21 in this embodiment of the present invention includes a sending module and an establishing module. The sending module is configured to enable the remote control device to send a connection request to the mobile terminal, where the mobile terminal receives the connection request from the remote control device and authenticates the connection request; and the establishing module is configured to enable the remote control device to establish the connection to the mobile terminal in a form of an IP direct connection after the connection request passes the authentication performed by the mobile terminal.

The remote control device sends a connection request to the mobile terminal, and the mobile terminal receives the connection request sent by the remote control device, and authenticates the connection request, so as to determine whether to establish a connection to the remote control device; if the authentication succeeds, the mobile terminal establishes a connection to the remote control device, or if the authentication fails, the mobile terminal does not establish a connection to the remote control device. After the authentication performed by the mobile terminal succeeds, that is, after the mobile terminal determines to establish a connection to the remote control device, the mobile terminal may establish a connection to the remote control device in a form of an IP direct connection, and use a channel of the IP direct connection as a channel for control. The connection between the remote control device and the mobile terminal is established in the form of an IP direct connection, which can improve a transmission speed of the control instruction.

Further, the mobile terminal may use a server to authenticate the connection request from the remote control device. Before the mobile terminal establishes the connection to the remote control device, both the mobile terminal and the remote control device may declare, to the server by using a semi-persistent connection, that they are online. The remote control device sends the connection request to the server, the mobile terminal sends information for authentication to the server, and the server is used to authenticate the connection request from the remote control device, to determine whether the connection request from the remote control device is a request for establishing a connection to the mobile terminal. After the authentication succeeds, the mobile terminal may be connected to the remote control device in a form of an IP direct connection, and the connection between the mobile terminal and the remote control device may not pass through the server. With the server, because both the remote control device and the mobile terminal may declare to the server that they are online, the server may authenticate requests of multiple remote control devices for establishing connections to multiple mobile terminals, or may authenticate requests of one remote control device for establishing connections to multiple mobile terminals.

The sequence numbers of the foregoing embodiments of the present invention are merely for the convenience of description, and do not imply the preference among the embodiments.

It should be noted that, for the ease of description, the foregoing method embodiments are expressed as a series of action combinations. However, a person skilled in the art should understand that the present disclosure is not limited to the described action sequence, because according to the present disclosure, some steps may be performed in other sequences or performed at the same time. Secondly, a person skilled in the art should also understand that the embodiments described in the specification are preferred embodiments, and the involved actions and modules are not indispensable to the present disclosure.

In the foregoing embodiments, description of each embodiment focuses on a different part, and for parts that are not described in detail in one embodiment, reference may be made to the related description of other embodiments.

In the embodiments provided in the present application, it should be understood that, the disclosed system, apparatus and method may be implemented in other manners. For example, the apparatus embodiment described above is merely a schematic embodiment. For example, the division of units is merely a division of logical functions, and division manners may be used in actual implementation. For example, multiple units or components may be combined or integrated into another system, or some features may be ignored or not performed. In addition, the displayed or discussed mutual couplings or direct couplings or communication connections may be implemented by using some interfaces; indirect couplings or communication connections between apparatuses or units may be electric or in other forms.

The units described as separate parts may or may not be physically separate; parts displayed as units may or may not be physical units, and may be located at one position, or distributed over multiple network units. Some or all of the units may be selected according to actual needs to achieve the objectives of the solutions of the embodiments.

In addition, the functional units in the embodiments of the present invention may be integrated into one processing unit, or each unit may exist as an independent physical unit, or two or more units may be integrated into one unit. The integrated unit may be implemented in a form of hardware, or in a form of a software functional unit.

When the integrated unit is implemented in the form of a software functional unit and sold or used as an independent product, the integrated unit may be stored in a computer-readable storage medium. Based on such an understanding, the essence of the technical solutions of the present disclosure, or in other words, the part that makes contributions to the existing technology, or some or all of the technical solutions may be implemented in a form of a software product. The computer software product is stored in a storage medium and includes several instructions to cause a computer device (which may be a personal computer, a mobile terminal, a server, a network device, or the like) to perform all or some of the steps of the method described in the embodiments of the present invention. The foregoing storage medium includes: any medium that can store program code, such as a USB flash disk, a read-only memory (ROM), a random access memory (RAM), a removable hard disk, a magnetic disk, or an optical disc.

The foregoing descriptions are merely preferred embodiments of the present invention, but are not intended to limit the present disclosure. A person skilled in the art may make various alterations and variations to the present disclosure. Any modification, equivalent replacement, or improvement made within the spirit and principle of the present disclosure shall fall within the protection scope of the present disclosure.

What is claimed is:

1. A mobile terminal control method, comprising:
   acquiring, by a mobile terminal, root-privileged system permission of an operating system installed on the mobile terminal;
   receiving, by the mobile terminal, a connection request from a remote control device via a server that is communicatively coupled to the mobile terminal and the remote control device, wherein the connection request is to establish a direct connection to the mobile terminal;
   in response to receiving the connection request, providing, by the mobile terminal, authentication information to the server, wherein the server is configured to authenticate the connection request based on the authentication information; and
   in accordance with a successful authentication of the connection request performed by the server:
      establishing, by the mobile terminal, a connection to the remote control device, wherein the connection grants the remote control device the root-privileged system permission of the operating system installed on the mobile terminal;

receiving, by the mobile terminal, a hardware parameter request from the remote control device after the mobile terminal establishes the connection to the remote control device, the hardware parameter request being used for requesting the mobile terminal to send a hardware parameter of the mobile terminal to the remote control device, wherein the hardware parameter includes a screen resolution of the mobile terminal;

sending, by the mobile terminal, the hardware parameter to the remote control device on the basis of the hardware parameter request, wherein the remote control device receives the hardware parameter and generates a virtual screen of the mobile terminal on the basis of the hardware parameter, and the remote control device sends a remote control instruction to the mobile terminal by triggering the virtual screen, and wherein a resolution of the virtual screen of the mobile terminal is the same as the screen resolution of the mobile terminal;

receiving, by the mobile terminal, the remote control instruction from the remote control device, the remote control instruction being an instruction recognizable to the operating system of the mobile terminal, and the remote control instruction being used for remotely controlling the mobile terminal; and recognizing, by the mobile terminal, the remote control instruction by using the operating system, and executing an operation corresponding to the remote control instruction on the basis of the root-privileged system permission.

2. The mobile terminal control method according to claim 1, wherein:

the acquiring, by the mobile terminal, the root-privileged system permission of the operating system of the mobile terminal includes: acquiring, by the mobile terminal, the root-privileged system permission by using a control application set on the mobile terminal, wherein the control application for acquiring the system permission is set on the mobile terminal; and the recognizing, by the mobile terminal, the remote control instruction by using the operating system and executing the operation corresponding to the remote control instruction on the basis of the root-privileged system permission includes:

sending, by the mobile terminal, the remote control instruction to the operating system by using the control application, and executing, by the operating system, the operation corresponding to the remote control instruction on the basis of the root-privileged system permission.

3. The mobile terminal control method according to claim 1, wherein the establishing, by the mobile terminal, the connection to the remote control device further includes:

establishing, by the mobile terminal, the connection to the remote control device in a form of an IP direct connection after the connection request passes the authentication performed by the server.

4. The mobile terminal control method according to claim 1, wherein the remote control device sends the remote control instruction to the mobile terminal by detecting a touching gesture on the virtual screen.

5. The mobile terminal control method according to claim 1, wherein the remote control device sends the remote control instruction to the mobile terminal in response to the virtual screen being touched.

6. The mobile terminal control method according to claim 1, wherein:

the root-privileged system permission allows a user account of the operating system to operate all objects of the operating system.

7. The mobile terminal control method according to claim 1, wherein:

the root-privileged system permission is associated with a root account of the mobile terminal, and the root account is a most privileged user account of the operating system.

8. A mobile terminal, comprising:

a processor; and a storage having instructions stored therein, wherein the instructions, when being executed by the processor, enables the processor to:

acquire root-privileged system permission of an operating system of the mobile terminal;

receive a connection request from a remote control device via a server that is communicatively coupled to the mobile terminal and the remote control device, wherein the connection request is to establish a direct connection to the mobile terminal;

in response to receiving the connection request, provide authentication information to the server, wherein the server is configured to authenticate the connection request based on the authentication information; and in accordance with a successful authentication of the connection request performed by the server:

establish a connection to the remote control device, wherein the connection grants the remote control device the root-privileged system permission of the operating system installed on the mobile terminal;

receive a hardware parameter request from the remote control device after the mobile terminal establishes the connection to the remote control device the hardware parameter request being used for requesting the mobile terminal to send a hardware parameter of the mobile terminal to the remote control device, wherein the hardware parameter includes a screen resolution of the mobile terminal;

send the hardware parameter to the remote control device on the basis of the hardware parameter request, wherein the remote control device receives the hardware parameter and generates a virtual screen of the mobile terminal on the basis of the hardware parameter, and the remote control device sends a remote control instruction to the mobile terminal by triggering the virtual screen, and wherein a resolution of the virtual screen of the mobile terminal is the same as the screen resolution of the mobile terminal;

receive the remote control instruction from the remote control device, the remote control instruction being an instruction recognizable to the operating system of the mobile terminal, and the remote control instruction being used for remotely controlling the mobile terminal; and recognize the remote control instruction by using the operating system and execute an operation corresponding to the remote control instruction on the basis of the root-privileged system permission.

9. The mobile terminal according to claim 8, wherein the instructions, when being executed by the processor, further enables the processor to:
acquire the root-privileged system permission by using a control application set on the mobile terminal, the control application for acquiring the system permission being set on the mobile terminal;
send the remote control instruction to the operating system by using the control application; and
execute the operation corresponding to the remote control instruction on the basis of the root-privileged system permission.

10. The mobile terminal according to claim 8, wherein the instructions, when being executed by the processor, further enables the processor to:
establish the connection to the remote control device in a form of an IP direct connection after the remote control device passes the authentication performed by the server.

11. A non-transitory computer readable storage medium storing one or more programs for execution by one or more processors of a mobile terminal, the one or more programs including instructions for:
acquiring root-privileged system permission of an operating system installed on the mobile terminal;
receiving a connection request from a remote control device via a server that is communicatively coupled to the mobile terminal and the remote control device, wherein the connection request is to establish a direct connection to the mobile terminal;
in response to receiving the connection request, providing authentication information to the server, wherein the server is configured to authenticate the connection request based on the authentication information; and
in accordance with a successful authentication of the connection request performed by the server:
establishing a connection to the remote control device, wherein the connection grants the remote control device the root-privileged system permission of the operating system installed on the mobile terminal;
receiving a hardware parameter request from the remote control device after the mobile terminal establishes the connection to the remote control device, the hardware parameter request being used for requesting the mobile terminal to send a hardware parameter of the mobile terminal to the remote control device, wherein the hardware parameter includes a screen resolution of the mobile terminal;
sending the hardware parameter to the remote control device on the basis of the hardware parameter request, wherein the remote control device receives the hardware parameter and generates a virtual screen of the mobile terminal on the basis of the hardware parameter, and the remote control device sends a remote control instruction to the mobile terminal by triggering the virtual screen, and wherein a resolution of the virtual screen of the mobile terminal is the same as the screen resolution of the mobile terminal;
receiving the remote control instruction from the remote control device, the remote control instruction being an instruction recognizable to the operating system of the mobile terminal, and the remote control instruction being used for remotely controlling the mobile terminal; and
recognizing the remote control instruction by using the operating system, and executing an operation corresponding to the remote control instruction on the basis of the root-privileged system permission.

* * * * *